United States Patent
Inani et al.

(10) Patent No.: US 7,494,893 B1
(45) Date of Patent: Feb. 24, 2009

(54) IDENTIFYING YIELD-RELEVANT PROCESS PARAMETERS IN INTEGRATED CIRCUIT DEVICE FABRICATION PROCESSES

(75) Inventors: Anand Inani, Singapore (SG); Brian E. Stine, Tokyo (JP); Marci Yi-Ting Liao, San Jose, CA (US); Senthil Arthanari, San Jose, CA (US); Michael V. Williamson, San Jose, CA (US); Spencer B. Graves, San Jose, CA (US); Guanyuan M. Yu, San Jose, CA (US)

(73) Assignee: PDF Solutions, Inc., San Jose, CA (US)

( * ) Notice: Subject to any disclaimer, the term of this patent is extended or adjusted under 35 U.S.C. 154(b) by 86 days.

(21) Appl. No.: 11/654,391

(22) Filed: Jan. 17, 2007

(51) Int. Cl.
*H01L 21/76* (2006.01)
(52) U.S. Cl. ...................................... 438/424
(58) Field of Classification Search .................. None
See application file for complete search history.

(56) References Cited

U.S. PATENT DOCUMENTS

| | | |
|---|---|---|
| 6,449,749 B1 | 9/2002 | Stine |
| 6,470,229 B1 | 10/2002 | Wang et al. |
| 6,475,871 B1 | 11/2002 | Stine et al. |
| 6,587,744 B1 | 7/2003 | Stoddard et al. |
| 6,594,618 B1 | 7/2003 | Azencott |
| 6,714,884 B2 * | 3/2004 | Dor et al. .................... 702/82 |
| 6,721,445 B1 | 4/2004 | Azencott |
| 6,725,098 B2 | 4/2004 | Edwards et al. |
| 6,787,800 B2 | 9/2004 | Weiland et al. |
| 6,795,952 B1 | 9/2004 | Stine et al. |

(Continued)

FOREIGN PATENT DOCUMENTS

EP        1 122 646 A1    8/2001

(Continued)

OTHER PUBLICATIONS

Andrzej J. Strojwas, et al. "Conquering Process Variability: A Key Enabler for Profitable Manufacturing in Advanced Technology Nodes (Keynote Speech)", Sep. 2006, 8 sheets, International Symposium On Semiconductor Manufacturing (ISSM), Tokyo, Japan.

(Continued)

*Primary Examiner*—Charles D. Garber
*Assistant Examiner*—Andre' C Stevenson
(74) *Attorney, Agent, or Firm*—Okamoto & Benedicto LLP

(57) ABSTRACT

In one embodiment, wafers are processed to build test structures in the wafers. The wafers may be processed in tools of process steps belonging to a process module. The test structures may be tested to obtain defectivity data. Tool process parameters may be monitored and collected as process tool data. Other information about the wafers, such as metrology data and product layout attribute, may also be collected. A model describing the relationship between the defectivity data and process tool data may be created and thereafter used to relate the process tool data to a yield of the process module. The model may initially be an initial model using process tool data from a limited number of test wafers that contain test structures. The model may also be an expanded model using process tool data from product wafers containing embedded test structures in areas with no product devices.

20 Claims, 7 Drawing Sheets

U.S. PATENT DOCUMENTS

| | | | |
|---|---|---|---|
| 6,804,563 | B1 | 10/2004 | Lafaye de Michaeaux |
| 6,826,738 | B2 | 11/2004 | Cadouri |
| 6,834,375 | B1 | 12/2004 | Stine et al. |
| 6,853,923 | B2 | 2/2005 | Trygg et al. |
| 6,892,367 | B2 | 5/2005 | Palusinski et al. |
| 6,901,564 | B2 | 5/2005 | Stine et al. |
| 6,970,857 | B2 | 11/2005 | Card et al. |
| 6,978,229 | B1 | 12/2005 | Saxena et al. |
| 7,003,742 | B2 | 2/2006 | Saxena et al. |
| 7,016,816 | B2 | 3/2006 | Mott |
| 7,024,642 | B2 | 4/2006 | Hess et al. |
| 7,039,543 | B1 | 5/2006 | Cadouri |
| 7,047,505 | B2 | 5/2006 | Saxena et al. |
| 7,072,985 | B1 | 7/2006 | Lev-Ami et al. |
| 7,087,507 | B2 | 8/2006 | Koldiaev et al. |
| 2002/0072162 | A1* | 6/2002 | Dor et al. ............... 438/200 |
| 2003/0220708 | A1* | 11/2003 | Sahin et al. ............. 700/121 |
| 2006/0111804 | A1 | 5/2006 | Lin |
| 2006/0246683 | A1* | 11/2006 | Pan et al. ............... 438/424 |

FOREIGN PATENT DOCUMENTS

EP      1 170 650 A1      1/2002

OTHER PUBLICATIONS

Christopher Hess, et al. "Yield Improvement Using a Fast Product Wafer Level Monitoring System", May 2006, 5 sheets, 17$^{th}$ Annual IEEE/SEMI Advanced Semiconductor Manufacturing Conference and Workshop (ASMC), Boston, MA.

David Abercrombie "Applying Effective Design for Manufacturing Techniques in Nanometer Technology", Apr. 10, 2006, pp. 1-41, EDATF, Mentor Graphics.

Dennis Ciplickas, et al. "Designing for High Product Yield" Oct. 1, 2002, pp. 1-6, PDF Solutions Inc, Semiconductor International [retrieved on Oct. 24, 2006]. Retrieved from the internet: http://www.reed-electronics.com/semiconductor/index.asp?layout=articlePrint&articleID=CA245210.

Principal components analysis—Wikipedia, the free encyclopedia, pp. 1-11, [retrieved on Oct. 25, 2006]. Retrieved from the internet: http://en.wikipedia.org/wiki/Principal_components_analysis.

Regression analysis—Wikipedia, the free encyclopedia, pp. 1-9, [retrieved on Oct. 25, 2006]. Retrieved from the internet: http://en.wikipedia.org/wiki/Regression_analysis.

* cited by examiner

IDENTIFYING YIELD-RELEVANT PROCESS PARAMETERS IN INTEGRATED CIRCUIT DEVICE FABRICATION PROCESSES

BACKGROUND OF THE INVENTION

1. Field of the Invention

The present invention relates generally to integrated circuit devices, and more particularly to integrated circuit device fabrication.

2. Description of the Background Art

Integrated circuit (IC) devices are generally fabricated on a substrate, such as a semiconductor wafer. The wafer is subjected to various fabrication processing steps to form dopant regions, dielectric layers, metal layers with metal lines, vias providing electrical connection between metal lines on different levels, trenches, and other regions and structures. The fabrication processing steps are generally well known and may include diffusion, implantation, deposition, electroplating, chemical-mechanical polishing (CMP), annealing, lithography, and etching, for example. The fabrication processing steps result in an integrated circuit device formed in one or more levels of the wafer. Several integrated circuit devices are typically formed on a single wafer. The integrated circuit devices are tested at different steps in the fabrication process to insure that they operate as designed. The tests allow for identification of defective devices so that they may be separated from good devices. The yield of a fabrication process is a measure of the number of good structures, self-contained devices, or regions relative to defective ones fabricated using the process.

Various process control mechanisms may be employed to monitor and control each step in the fabrication process. However, due to the complexity of fabrication processes and the large number of process parameters involved in each processing step, it is relatively difficult to monitor and control a processing step. Embodiments of the present invention allow for identification of process parameters that appreciably affect yield, resulting in a manageable number of process parameters that may be monitored and optimized to increase yield, improve device performance, or both.

SUMMARY

In one embodiment, wafers are processed to build test structures in the wafers. The wafers may be processed in tools of process steps belonging to a process module. The test structures may be tested to obtain defectivity data. Tool process parameters may be monitored and collected as process tool data. Other information about the wafers, such as metrology data and product layout attribute (e.g. layer density), may also be collected. A model describing the relationship between the defectivity data and process tool data may be created and thereafter used to relate the process tool data to a yield of the process module. The model may initially be an initial model using process tool data from a limited number of test wafers that contain test structures. The model may also be an expanded model using process tool data from product wafers containing embedded test structures in areas with no product devices. Process tool data in the extended model may be selected using information from the initial model. The initial and extended models may be employed independently or together.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
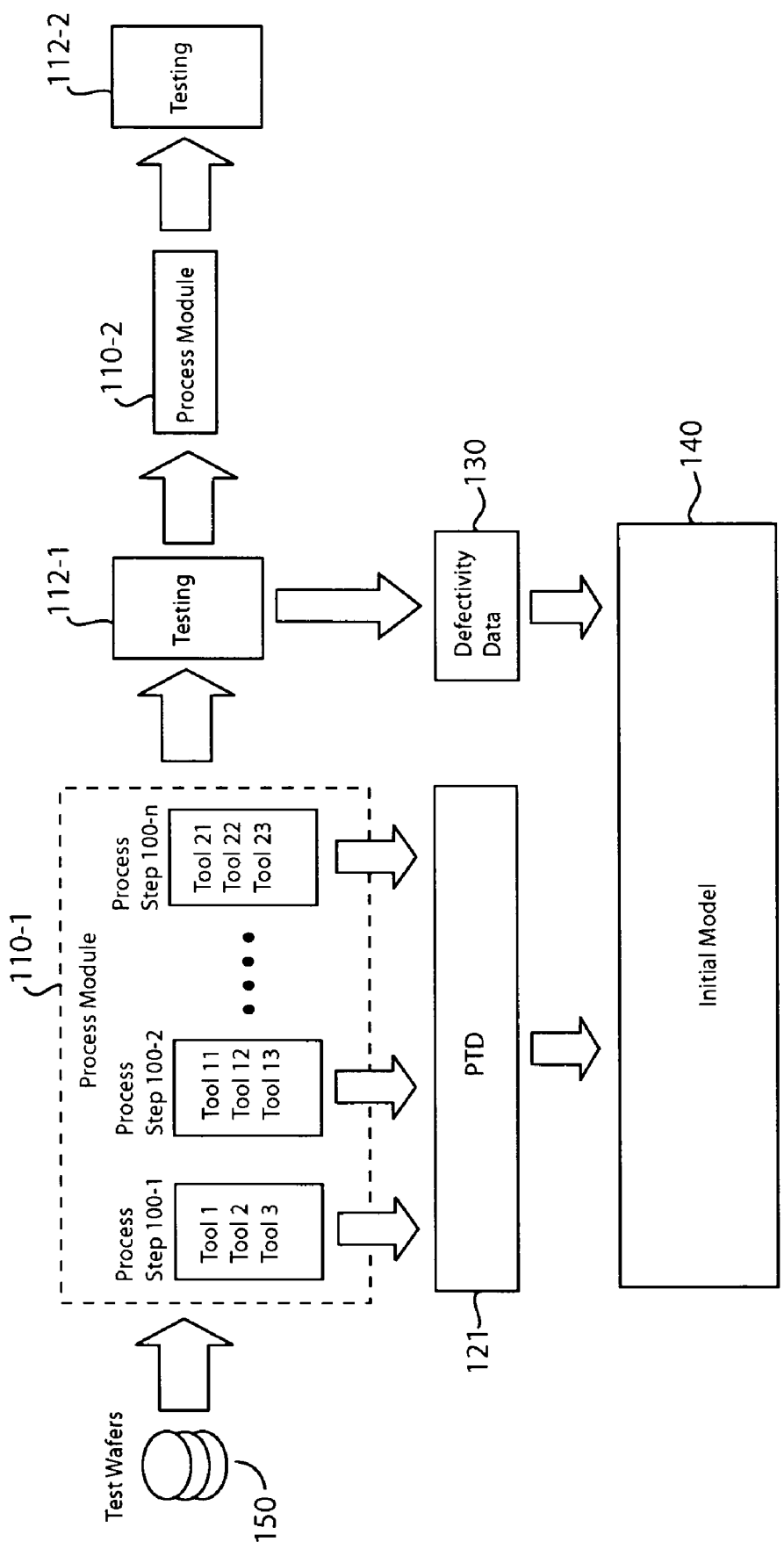
FIG. 1 shows a flow diagram schematically illustrating identification of yield-relevant process parameters in an integrated circuit device fabrication process in accordance with an embodiment of the present invention.

FIG. 1 shows a flow diagram schematically illustrating identification of yield-relevant process parameters in an integrated circuit device fabrication process in accordance with an embodiment of the present invention. In the example of FIG. 1, the fabrication process may comprise one or more process modules 110 (i.e., 110-1, 110-2, . . . ), with each process module 110 comprising one or more process steps 100 (i.e., 100-1, 100-2, . . . ). A process module 110 may comprise a set of process steps 100 for fabricating a structure or region of the integrated circuit device. A process step 100 may be a chemical vapor deposition step, CMP, electroplating, physical vapor deposition step, diffusion step, etching step, lithography step, or other device fabrication step. Each process step 100 is performed in a device fabrication equipment commonly referred to as a "processing tool" or simply "tool." A given fabrication facility may have more than one tool to perform a process step. In process module 110-1 of FIG. 1, the process step 100-1 may be performed in tool 1, tool 2, or tool 3. Likewise, the process step 100-2 may be performed in tool 11, tool 12, or tool 13. A fabrication facility may have more or less tools for a particular process step but only a few are shown in FIG. 1 for clarity of illustration.

Figure 2:
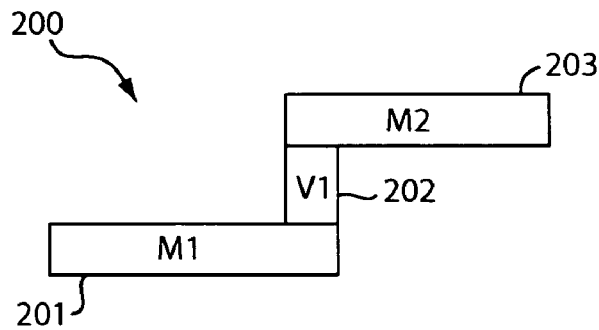
FIG. 2 schematically shows a cross-section of an example integrated circuit structure.

As a particular example, FIG. 2 shows an integrated circuit structure 200 comprising a metal line 201 on a first metal level ("M1"), a metal line 203 on second metal level ("M2"), and a via 202 ("V1") electrically connecting the metal line 201 to the metal line 203. Fabricating the structure 200 may require at least three process modules 110: a) a process module 110-1 for forming the metal line 201; b) a process module 110-2 for forming the via 202; and c) a process module 110-3 (not shown in FIG. 1) for forming the metal line 203. The process module 110-1 for forming the metal line 201 may have several process steps 100 including a process step 100-1 for depositing a metal layer, a process step 100-2 for etching the metal layer to form the metal line 201, and so on. The process step 100-1 may be performed in any one of physical vapor deposition (PVD) tools available in the fabrication facility (e.g., tool 1, tool 2, or tool 3), the process step 100-2 may be performed in any one of etchers available in the fabrication facility (e.g., tool 11, tool 12, or tool 13), and so on. The structure 200 may be used as a test structure to evaluate the capability of a process module 110 to process a wafer to build a device. For example, the structure 200 may be designed to include features of product devices that will be built using the process steps of the process module 110-1.

In the example of FIG. 1, the flow diagram begins with test wafers 150 being processed through the process module 110-1. The test wafers 150 may comprise so-called "short flow characterization vehicles" in that each of them will be processed through a process module to build test structures designed for evaluating process steps of the process module. For example, the test wafers 150 may be processed to include test structures for testing via formation, mask alignment, deposition, etc. Typically but not necessarily, the test wafers 150 do not contain any product devices (i.e., devices for commercial sale). This makes running the test wafers 150 relatively expensive compared to, for example, product wafers with embedded test structures. In return, however, the test structures on the wafers 150 have no substantial process window and real estate constraints, and thus may be designed to include features for ease of testing and access and more comprehensive process evaluation. The test wafers 150 may comprise, for example, CV® test chips (or other characterization vehicles) from PDF Solutions, Inc., of San Jose, Calif. Other test wafers may also be used without detracting from the merits of the present invention. Test wafers with structures for evaluating process steps and yields are also disclosed in the following commonly-assigned disclosures, which are incorporated herein by reference in their entirety: U.S. Pat. No. 6,449,749; U.S. Pat. No. 6,475,871; U.S. Pat. No. 6,795, 952; and U.S. Pat. No. 6,834,375.

Each test wafer 150 may be run through the process steps 100 of a process module 110 to build the test structures. For example, tool 1 in process step 100-1 may process a test wafer 150 to build a portion of a test structure, tool 12 in process step 100-2 may process the test wafer 150 to build another portion of the test structure, and so on. In one embodiment, the process tool data (PTD) 121, also referred to as "Fault Detection and Classification" data, comprise process parameters by which a wafer is processed by a tool and may cause a defect in the processed wafer. That is, each data in the PTD 121 may be a process parameter that may impact the fabricated structure or region on the wafer, and it also may be the statistics calculated from the time trace of such process parameters. The PTD 121 may depend on the type of the tool and may include, for example, gas flow, chamber pressure, etch bias voltage, process temperature, etc., and the statistics may be mean values, minimum values, etc. of the process parameters. As a particular example, assuming tool 1 of the process step 100-1 is a PVD tool and the process step 100-2 is an etcher, the PTD 121 may include gas flow and coil current of tool 1 and etch bias voltage and chamber pressure of tool 2. The PTD 121 may be provided by their respective tools, and may be collected from the tools' sensor and configuration data.

The PTD 121 may primarily or only include high frequency data of the tools. High frequency data are those that occur whenever a wafer is processed. Examples of high frequency data include gas flow, chamber pressure, etch bias voltage, etc. In contrast, low frequency data are those that only occur from time to time and not during every wafer run. Examples of low frequency data include preventive maintenance schedules, time intervals between wafer processing, etc.

Test structures in the test wafers 150 may be tested after processing through one or more process modules 110. The tests may be performed by probing or non-probing means (e.g., e-beam by voltage contrasts). In the example of FIG. 1, the test wafers 150 are subjected to an electrical testing 112 (i.e., 112-1, 112-2, . . . ) after processing through a process module 110. An electrical testing 112 may look for various defects, such as opens and shorts, in the test structures in the test wafers 150.

The defectivity data 130 may comprise defects found in the test wafers 150. Particular examples of defectivity data may include a short on the metal line 201, an open via 202, an open on the metal line 203, etc. The defectivity data 130 may also be in the form of fail rate or defect density ($D_0$), for example. Fail rate may be expressed in number of fails per feature count (e.g., contact fail rate of 1 fail per 1 billion contact), and defect density may be expressed in defects per $cm^2$.

In one embodiment, an initial model 140 comprises a model describing the relationship between one or more process parameters in the PTD 121 and the defectivity data 130, for a particular process module 110 or multiple process modules 110-1, 110-2, etc. Each test wafer 150 has a set of corresponding PTD 121 by which that wafer was processed. For example, that test wafer 150 will have corresponding PTD 121 from the tool in the process step 100-1, the tool in the process step 100-2, etc. in the process module 110-1. The defectivity data 130 and the PTD 121 for that test wafer 150 may be aligned by statistical analysis to determine the effect, if any, of a process parameter in the PTD 121 to a defect found in the electrical testing 112-1. This alignment of the PTD 121 and the defectivity data 130 may be performed for several test wafers 150 (e.g., about 60 to 100 test wafers) to get a statistically relevant number of samples to build the initial model 140. An initial model 140 may be created for each process module 110 by using regression analysis, such as stepwise regression, on the PTD 121 and the defectivity data 130.

A model 140 may include a model for a defect density $D_0$, $_{defect}$ as follows:

$$D_{0,defect} = k0 + k1\,(data1) + k2\,(data2) +$$

where k0 is a constant, K1 is the coefficient for a first process parameter in the PTD 121, K2 is the coefficient for a second process parameter in the PTD 121, and so on. As can be appreciated, data1, data2, and so on may be a univariate or multivariate process parameter in the PTD 121. A univariate process parameter has a single variable (e.g., gas flow). A multivariate process parameter has two or more variables and may comprise a combination of process parameters. Examples of multivariate process parameters include gas flow ratio, which may be the ratio of He gas flow versus Ar gas flow, for example.

As a particular example, an open metal line 201 defect may be modeled in the initial model 140 as follows:

$$D_{0,open\_metal201} = k0 + k1\,(\text{gas flow in a process step}) + k2\,(\text{etch bias voltage in a process step}) +$$

where gas flow is the first process parameter in the PTD 121, etch bias voltage is the second process parameter in the PTD 121, and so on.

Note that the initial model 140, unlike the extended model 340 discussed later on below, does not necessarily have to track the particular tool used to process the test wafer 150 in a particular step. That is, the model 140 is concerned with process steps 100, not particular tools in those process steps, due to the limited number of samples involved when using test wafers.

The impact of a process parameter to the expected yield of a process module 110 may be determined from the initial model 140. As can be appreciated, a yield may be a "final" (i.e., overall) yield of an entire fabrication process or a "limited" (i.e., partial) yield of the process. In this disclosure, the term "yield" refers to either a final or limited yield depending on the context. For example, the yield of a process module may be a limited yield if there are other process modules that affect the overall yield of the process. On the other hand, the yield of a process module may be the overall yield if the only yield loss in the entire process is due to that process module.

In general, the yield Y of a process module may be represented as:

$$y = e^{-CA(x)D_o}$$ or $$y = e^{-\lambda N}$$

Where CA(x) is the critical area of defect size x, $D_0$ is defect density, $\lambda$ is the fail rate, and N is the feature count for the fail rate. Thus, from the relationship between defectivity and process tool data in the initial model 140, the impact of a process parameter to expected yield may be determined. For example, substituting for defectivity from the initial model, the expected yield may be expressed as follows:

$$Y = e^{-CA(x)(k0 + k1(data1) + k2(data2) + \ldots)}$$

where data1, data2, etc. comprise process parameters included in collected process tool data. Therefore, the effect of a process parameter to the expected yield may be determined using the flow diagram of FIG. 1. Each process parameter may then be ranked according to its impact on the expected yield. This allows process engineers to focus and monitor those process parameters that have the most impact on yield.

Although using test wafers 150 to identify yield-relevant process parameters is advantageous in that the test wafers 150 may allow for more comprehensive test structures, running test wafers through the production line is generally costly. This limits the number of test wafers 150 and the tools they may be run in, resulting in a relatively limited number of PTD 121 and defectivity data 130 that can be used to build the initial model 140. Thus, although the initial model 140 may be good enough to determine process parameters that appreciably impact yield, a more holistic model may be needed for some processes.

Figure 3:
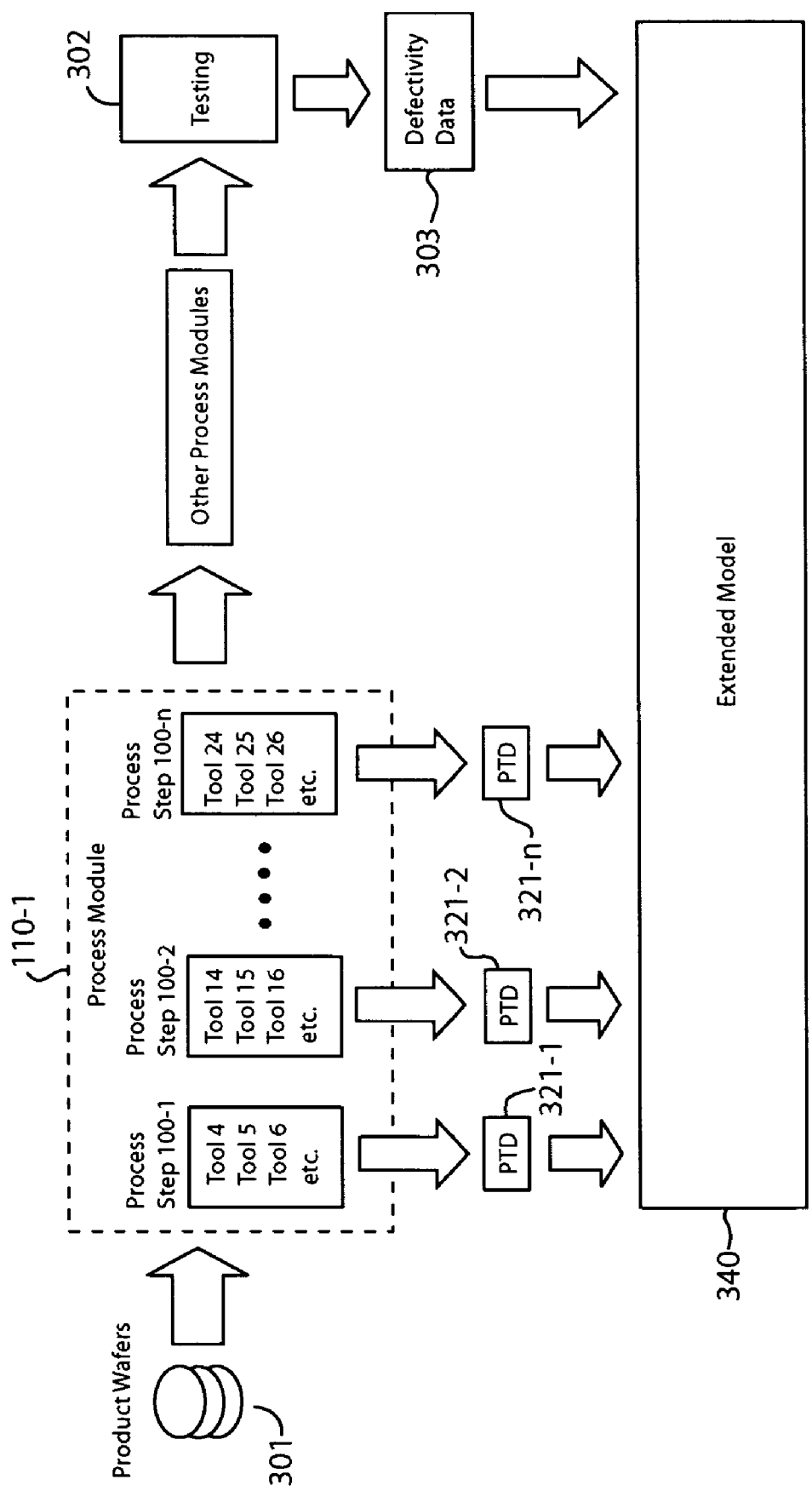
FIG. 3 shows a flow diagram schematically illustrating identification of yield-relevant process parameters in an integrated circuit device fabrication process in accordance with an embodiment of the present invention.

Referring now to FIG. 3, there is shown a flow diagram schematically illustrating identification of yield-relevant process parameters in an integrated circuit device fabrication process in accordance with an embodiment of the present invention. The flow diagram of FIG. 3 may be performed after creation of the initial model 140 of FIG. 1.

In the example of FIG. 3, the product wafers 301 are processed to create product devices (i.e., integrated circuit devices for commercial sale) and may contain test structures for evaluating a process module 110. Because of limited available space in the product wafers 301, these test structures may have limited observability compared to those in the test wafers 150 but may be located, for example, in scribe lines or other space not occupied by product devices. Examples of test structures that may be built in the product wafers 301 include the Scribe Characterization Vehicles® test structures from PDF Solutions, Inc. Other test structures may also be used without detracting from the merits of the present invention. For example, the test structures disclosed in the incorporated U.S. patents or limited versions thereof may also be employed.

In the example of FIG. 3, the product wafers 301 are run through the process steps 100 of a process module 110 to build the test structures and the product devices. For each process step 100, a product wafer 301 may be processed in any of the tools used in production. This allows for more samples from a larger number of tools. Note that the tools in the flow diagram of FIG. 3 may also include some or all of the tools in the flow diagram of FIG. 1. However, the flow diagram of FIG. 3 involves more wafers and more tools than in FIG. 1. That is, the set of tools available for processing the product wafers 301 may be larger than the set of tools available for processing the test wafers 150.

Process tool data (PTD) 321 may be collected for each tool a product wafer 301 is processed in. For example, the PTD 321-1 may be from tool 4, tool 5, tool 6, or another tool for process step 100-1, the PTD-321-2 may be from tool 14, tool 15, tool 16, or another tool for process step 100-2, and so on. The PTD 321 may comprise process parameters by which the product wafers 301 are processed, and are thus similar to the PTD 121 except that the PTD 321 includes low frequency data as well as high frequency data. The low frequency data allow the subsequently built extended model 340 to take into account time-related events, such as preventive maintenance, for each particular tool.

Depending on their design, the test structures in the product wafers 301 may not be accessible for testing until after the product wafers 301 have been processed through several process modules. For example, even when a test structure is completed in the process module 110-1, pads for coupling to that test structure may not be formed until after the next process module. In that case, the test structure is not subjected to the electrical testing 302 until after several process modules. Defectivity data 303 may comprise defect density, fail rate, or other indicator of defects detected during testing, and are thus similar to the defectivity data 130 except that the defectivity data 303 are from testing the product wafers 301.

In one embodiment, the extended model 340 comprises a model describing the relationship between one or more data in PTD 321 from a particular process tool and corresponding defectivity data 303, for a particular process module 110. Each product wafer 301 has a corresponding PTD 321 by which that wafer was processed. That is, that product wafer 301 will have corresponding PTD 321-1 from a particular tool in the process step 100-1, PTD 321-2 from a particular tool in the process step 100-2, etc. in the process module 110-1. The defectivity data 303 of that product wafer 301 and the PTD 321 for each tool where that product wafer 301 was processed may be aligned by statistical analysis to determine the effect, if any, of a process parameter in the PTD 321 of a particular tool to a defect found in the electrical testing 302. This alignment of the PTD 321 of a particular tool and the defectivity data 303 may be performed for several product wafers 301 (e.g., 500 or more product wafers) to get a statistically relevant number of samples to build the extended model 340. In one embodiment, an extended model model 340 is created for each process module 110 by using stepwise regression on the PTD 321 for a particular tool and the defectivity data 303. To further optimize the extended model 340 and to eliminate possible noise data, the process tool data incorporated in the model 340 may be selected from those indicated in the initial model 140 as appreciably affecting the yield.

An extended model 340 may include a model for a defect density $D_{0, \, defect, tool}$ for a particular tool as follows:

$$D_{0, defect, tool} = k0 + k1 \, (\text{data1\_tool}) + k2 \, (\text{data2\_tool}) +$$

where k0 is a constant, K1 is the coefficient for a process parameter in the PTD 321 for a particular tool in a process step, K2 is the coefficient for a process parameter in the PTD 321 for the particular tool or another tool in another process step, and so on. As an example, an open metal line 201 defect for tool 4 of the process step 100-1 may be modeled in the initial model 340 as follows:

$$D_{0, open\_metal201, tool4} = k0 + k1 \, (\text{gas flow in tool 4}) + k2 \\ (\text{RF forward and reverse power in a tool in another process step})$$

where gas flow in tool 4 is a process parameter in the PTD 321, RF forward and reverse power is a combined process parameter in the PTD 321, and so on. Note that the extended model 340 is similar to the initial model 140 except that the extended model 340 is per tool per process module. This allows the extended model 340 to capture not just the time elements of a process (e.g., low frequency data), but also variations between tools in the same process step. Information on tool variations is important for an accurate model because tools are so complex that it is very difficult to build identical ones or to match the tools to each other afterwards.

The impact of a process parameter of a particular tool to the expected yield of a process module 110 may be determined from the extended model 340. Substituting for defect density $D_0$ in the yield equation for a process module results in:

$$Y_{tool} = e^{-CA(x)(k0 + k1(data1\_tool) + k2(data2\_tool) + \ldots)}$$

Where $Y_{tool}$ is the expected yield of the process module per particular tool, the CA(x) is the critical area, and the data are from the particular tool in a process step or any tool in other process steps, as appropriate. As in the initial model 140, the process parameters represented by the process tool data may be ranked according to their impact on expected yield.

Figure 4A:
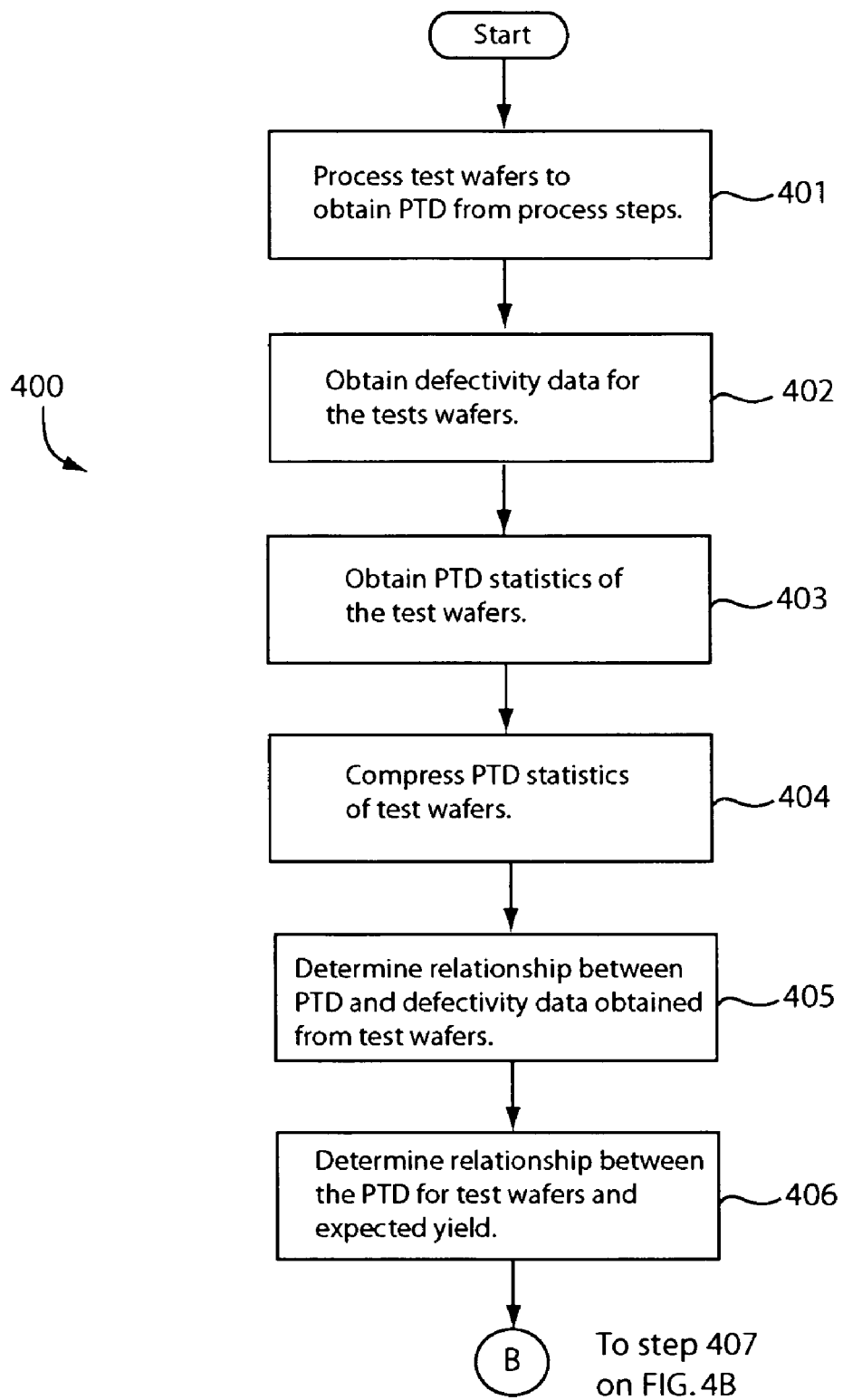
FIG. 4, which consists of FIGS. 4A and 4B, shows a flow diagram of a method of identifying yield-relevant process parameters in an integrated circuit device fabrication process in accordance with an embodiment of the present invention.
Figure 4B:
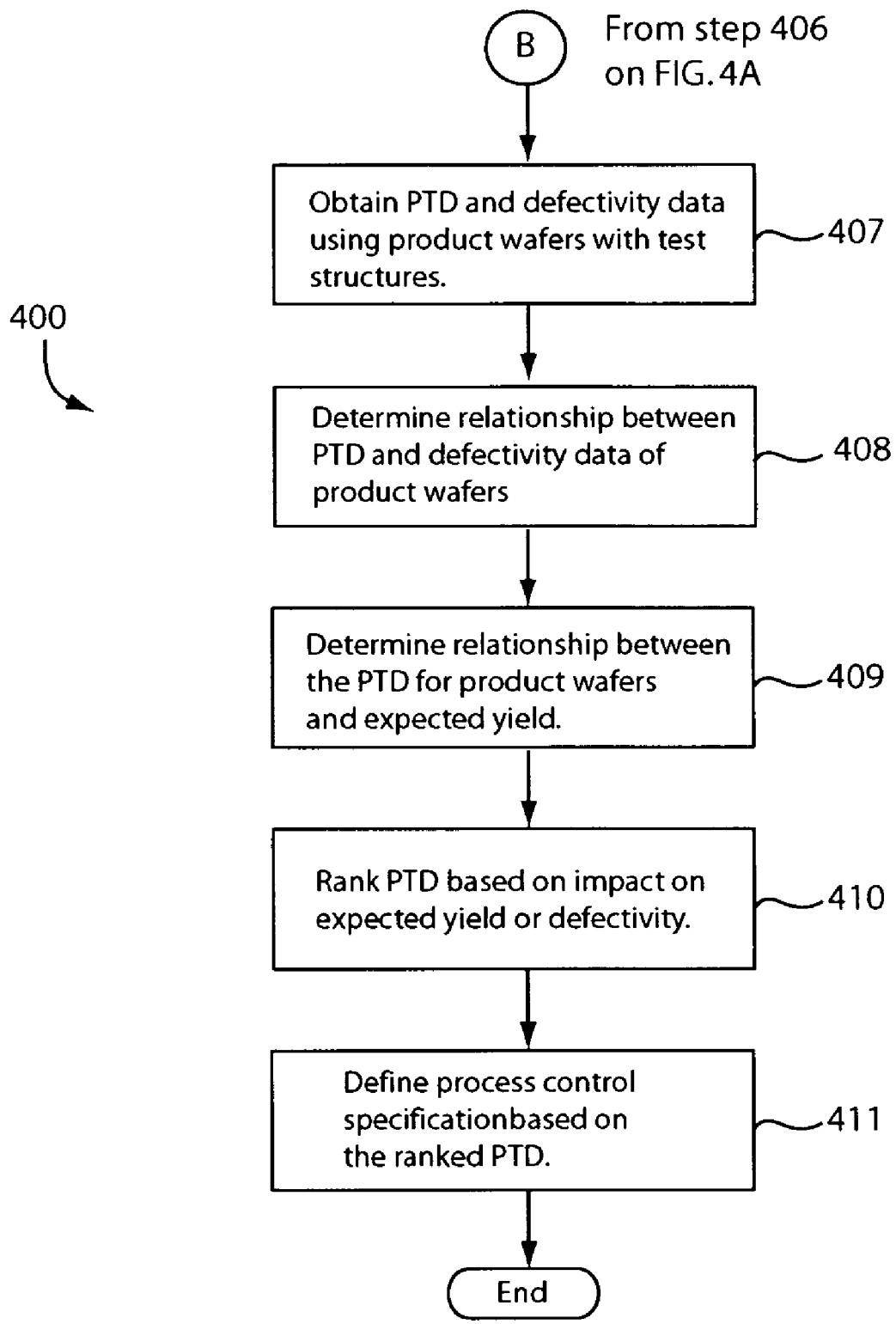

FIG. 4, which consists of FIGS. 4A and 4B, shows a flow diagram of a method 400 of identifying yield-relevant process parameters in an integrated circuit device fabrication process in accordance with an embodiment of the present invention. Note that FIG. 4A illustrates the creation of an initial model, while FIG. 4B illustrates the creation of an extended model. In one embodiment, the steps of creating the initial and extended models are linked together in the same method as in FIG. 4. It should be understood, however, that each of these models may also be created and employed independent of each other.

In step 401, test wafers are processed through one or more process modules to build test structures for evaluating the process modules. The process module may comprise a plurality of process steps, with each process step being performed using a tool. Process tool data comprising process parameters obtained from the tools used to process the test wafers are obtained for each process step. The process tool data obtained in step 401 may primarily consist of process parameters that occur during each wafer processing (i.e., high frequency data). As a particular example, assuming a first test wafer has been processed through tool 1 of the process step 100-1, tool 11 of the process step 100-2, etc., process tool data from tools 1, 11, etc. are obtained.

In step 402, the test structures on the test wafers are tested after processing in the process module to obtain defectivity data. Continuing the first test wafer example, the first test wafer may be electrically tested after being processed through the process module 110-1. The defectivity data may comprise defect density or fail rate. Preferably, failures during testing of the test wafers are normalized prior to being used as defectivity data. The normalization procedure allows the defectivity data to be independent of the design of the test structures. For example, interconnect lines, such as polysilicon or metal, may be normalized per unit length. As another example, holes, such as contacts or vias, may be normalized per count, e.g., ten failures per billion holes. Other suitable normalization procedures may also be used.

In step 403, statistics of the process tool data are obtained. These statistics may comprise minimums, maximums, rates, and other points or ranges of process tool data that are of importance to process engineering. For example, statistics for gas pressure may include the standard deviation gas pressure over a period of time, the arithmetic mean gas pressure over a period of time, gas pressure over time per 100 ms, etc. Note that the process tool data itself can be considered as statistics. That is, process tool data may simply be the process tool data itself or its statistics.

In step 404, the process tool data statistics are compressed. Compression lowers the number of process tool data statistics to be analyzed by combining highly correlated data or removing noise data. In one embodiment, principal components analysis (PCA) is employed to compress process tool data statistics. Other suitable data compression algorithms may also be employed.

In step 405, the relationship between the process tool data and defectivity data of the test wafers is determined. A model describing the relationship between the process tool data and the defectivity data of test wafers is also referred to as an initial model. Continuing the first test wafer example, the process tool data of tools used to process the first test wafer in the process modules are aligned with defects, if any, found in the first test wafer. This alignment of process tool data and defectivity data may be performed for several test wafers. In one embodiment, stepwise regression analysis is employed to determine the relationship between process tool data and defectivity data. Other suitable regression algorithms may also be employed.

In step 406, the relationship between the process tool data of the tools used to process the test wafers and the expected yield of the process module is determined. Step 406 may be performed by inputting the initial model from step 405 into another model describing a relationship between yield and defectivity. That is, defectivity may be represented in terms of process tool data from the initial model, and then substituted for defectivity in another model describing the relationship between yield and defectivity. For example, defectivity may be represented in terms of process tool data and then substituted for $D_0$ in the yield equation $Y = e^{-CA(x)D_0}$, as previously discussed. Other yield models that relate defectivity to yield may also be used with the initial model, including the PDF Solutions yield impact (YIMP) model.

Step 407 is similar to steps 401-404 except that they are performed on product wafers containing embedded test structures built in areas not containing product devices. In step 407, the product wafers are processed through the process steps of the process module being evaluated to build the embedded test structures. Process tool data from each tool in each process step are obtained for each product wafer. The process tool data obtained in step 407 may comprise process parameters that occur during each wafer processing (i.e., high frequency data) and also process parameters or events that only occur from time to time and not in every wafer run (i.e., low frequency data). For example, assuming a first product wafer has been processed through tool 4 of the process step 100-1, tool 14 of the process step 100-2, etc., process tool data from tools 4, 14, etc. are obtained.

Also in step 407, the test structures in the product wafers are tested to obtain defectivity data. Continuing the first product wafer example, the first product wafer may be electrically tested to obtain defect density or fail rate of the first product wafer, if any. Statistics of the defectivity data may be obtained and compressed using methodologies described in steps 403 and 404.

In step 408, the relationship between the process tool data and defectivity data of the product wafers is determined. A model describing the relationship between the process tool data and the defectivity data of product wafers is also referred to as an extended model. In one embodiment, process tool data identified from the initial model as not appreciably affecting the yield are not included in building the extended model. Continuing the first product wafer example, the process tool data of particular tools used to process the first product wafer in the process module are aligned with defects, if any, found in the first product wafer. This alignment of process tool data and defectivity data may be performed for a number of product wafers to obtain a statistically relevant sample size. As in step 405, stepwise regression analysis may be employed to determine the relationship between process tool data and defectivity data. Other suitable regression algorithms may also be employed.

In step 409, the relationship between the process tool data of each particular tool used to process the product wafers and the expected yield of the process module is determined. As in step 406, step 409 may be performed by inputting the extended model from step 408 into another model describing a relationship between yield and defectivity. That is, defectivity may be represented in terms of the process tool data from the extended model for each particular tool and then substituted for defectivity in another model describing the relationship between yield and defectivity. This allows for determination of the impact of a process parameter (process tool data in this example) of a particular tool of a process step of a process module on the expected yield of the process module.

In step 410, the process tool data included in the extended model are ranked based on their impact on expected yield or defectivity. These process tool data are then extracted or converted back into their original, univariate process tool data space as captured during measurement if necessary. The process tool data may also be ranked in terms of how wide they vary compared to the process window. For example, assuming the process window is relatively narrow for the wide variation of process tool data, more attention may be paid to that process tool data.

In step 411, a process control specification is defined based on the process tool data ranked in step 410. The specification may capture and balance: (1) the tolerable limit of a process parameter before it significantly and detrimentally affects yield, (2) the capability of the fabrication facility to achieve the necessary process window or specification limit, and (3) the severity of an out of spec situation.

The process control specification may define maximum and minimum limits for a given process parameter of a particular tool. For example, if a gas pressure from a particular tool in a process step of a process module appreciably impacts the yield of the process module when it varies by more than 10% from a nominal value, the process control specification for that process may require that the gas pressure be maintained within 10% or less of the nominal value, depending on the capability of the fabrication facility.

A process parameter may be found to affect the yield significantly and is therefore captured in the extended model. However, the process parameter may have a fairly binary response: the parameter may have little effect upon yield until a region is passed, where beyond this region the yield is severely impacted. In this case, the specification may indicate a window where there is a trigger before this region is passed, warning the process engineer that, while the wafer may be still be good, it was nearly lost. This is a low severity alarm. However, as the region is passed, a higher severity alarm may be triggered that recommends the wafer to be scrapped or the tool responsible be taken down to determine root cause and fix the tool.

Figure 5A:
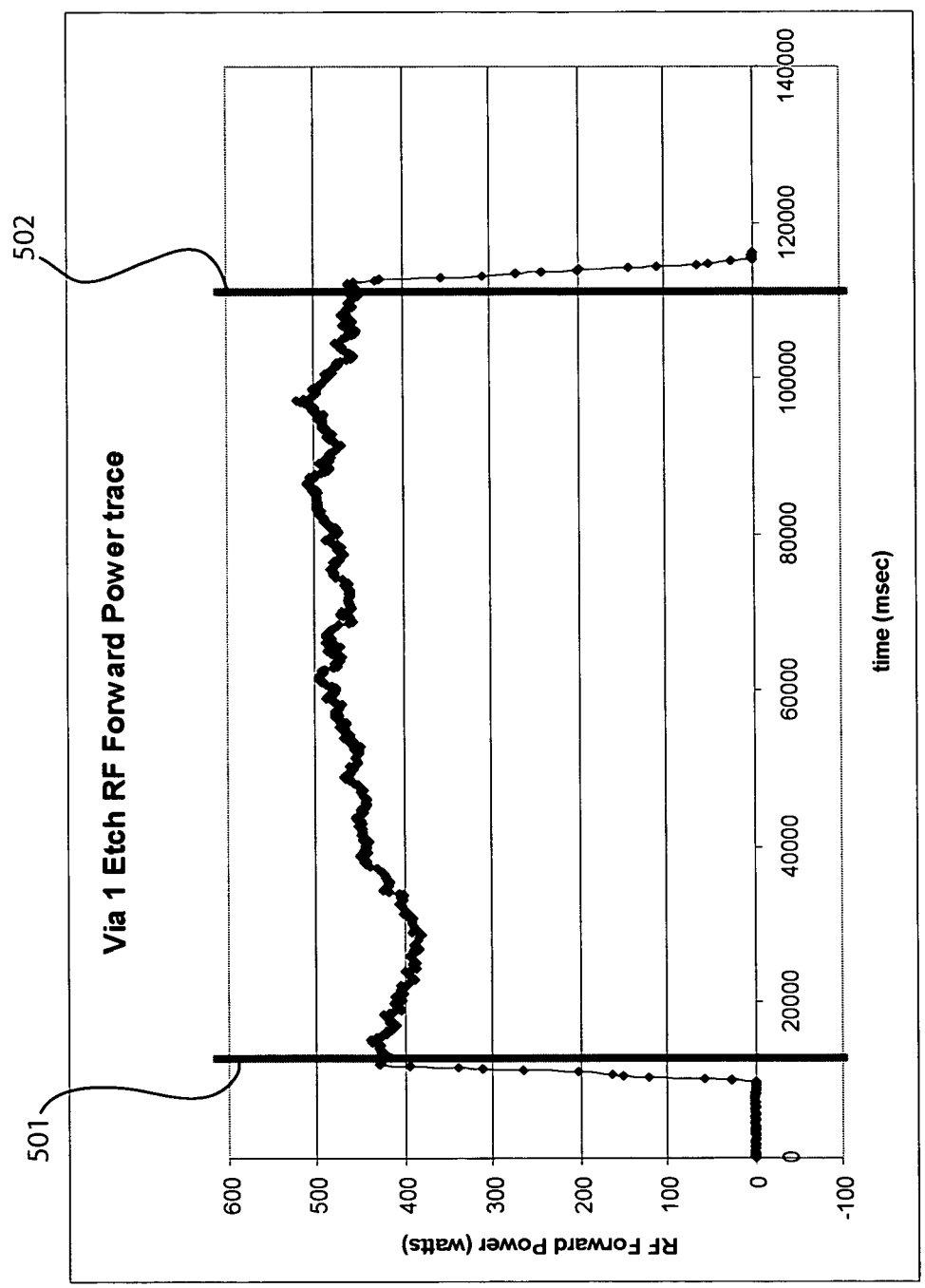
FIG. 5A shows a plot of an example process tool data.
Figure 5B:
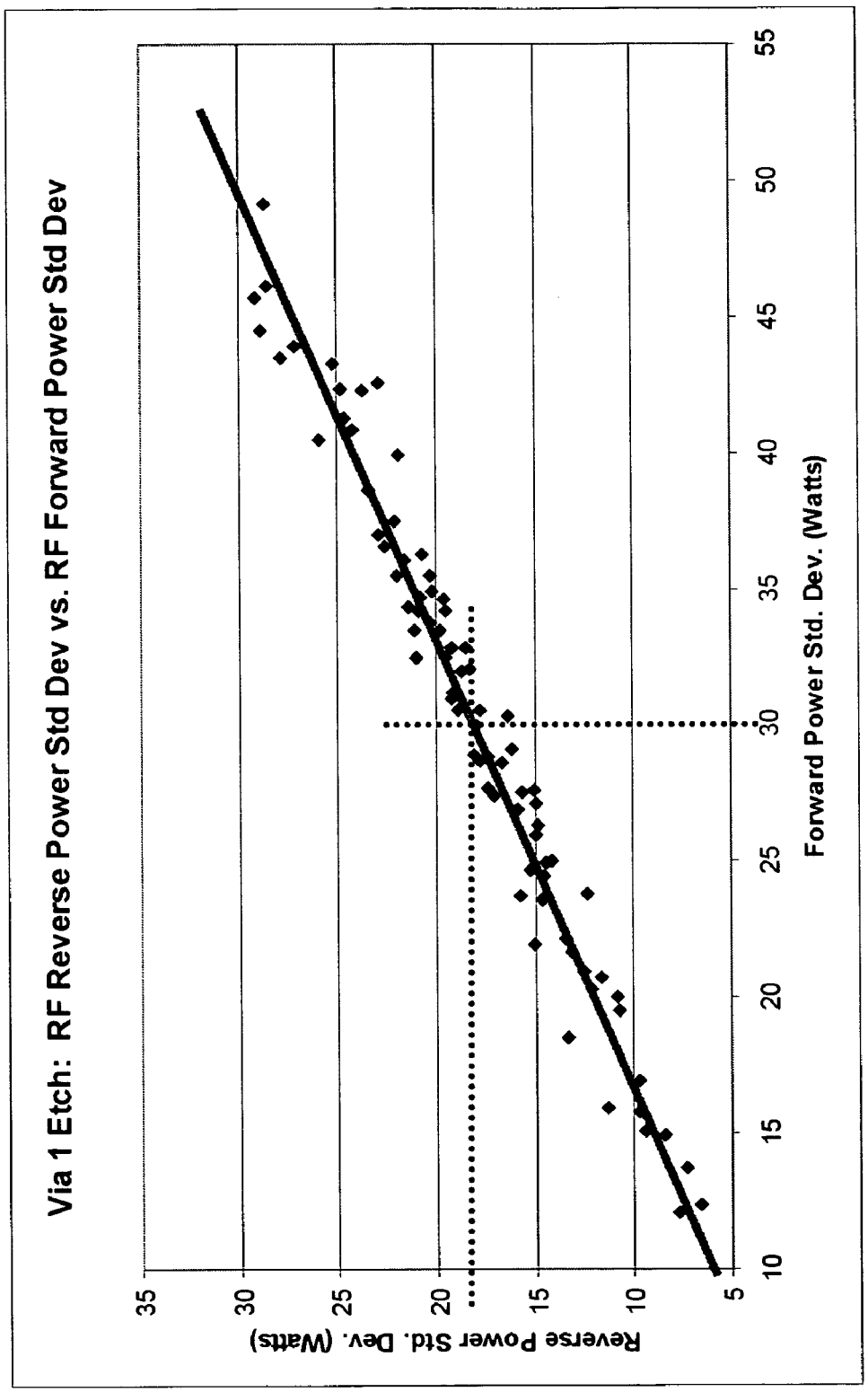
FIG. 5B shows a plot illustrating correlation between two example process tool data.

As a particular example, a process module for fabricating a via ("via process module") may have a first process step for depositing an interlevel dielectric ("ILD deposition step"), a second process step for forming a mask ("lithography step") over the interlevel dielectric, and a third process step for etching the interlevel dielectric ("etching step"). Process tool data from a tool from each of the process steps are obtained. FIG. 5A shows an example plot of RF forward power from an etcher in the etching step. Data points of the etcher's RF forward power when it is ON (data points between lines 501 and 502) are collected as process tool data. Data points for the RF reverse power (not shown) of the etcher are also collected as process tool data. FIG. 5B shows a plot comparing the standard deviations of the RF forward and reverse powers of the etcher in the etching step of the via process module, indicating that the RF forward and reverse powers are highly correlated. This means that the RF forward and reverse powers do not have to be separately taken into account, thereby allowing for compression of the collected process tool data. Principal components analysis, for example, may be employed to find highly correlated process tool data.

Table 1 shows example defectivity data, yield, and process tool data for the via process module. Each row in table 1 represents data for a single wafer, which is a test wafer in this example. The first column is for defectivity data; the second column is for RF forward and reverse powers of the etcher in the etching step (first PTD); the third column is for gas flows (A and B) and chamber pressure of the chemical vapor deposition (CVD) tool in the ILD deposition step (second PTD); and the fourth column is for X&Y rotational misalignment in the lithography tool in the lithography step (third PTD). The second, third, and fourth columns of table 1 each has one value for highly correlated process tool data.

TABLE 1

| Defectivity Data | 1st PTD RF For/Rev Power | 2nd PTD ILD Dep; Gas flow A&B and Chamber Pressure | 3rd PTD Litho; X&Y Rotational Misalignment |
| --- | --- | --- | --- |
| 14.37 | 25.49 | 47.71 | 0.17 |
| 8.75 | 16.31 | 49.81 | 0.22 |
| 11.4 | 18.95 | 53.37 | 0.22 |
| 7.29 | 15.55 | 47.14 | 0.08 |
| 7.59 | 16.13 | 50.86 | 0.13 |
| 11.33 | 18.18 | 49.49 | 0.24 |
| 7.74 | 16.22 | 49.25 | 0.11 |
| 8.04 | 7.16 | 52.02 | 0.19 |
| 10.37 | 17.55 | 48.67 | 0.11 |
| 11.16 | 23.1 | 51.84 | 0.13 |
| 7.53 | 14.79 | 51.94 | 0.24 |
| 9.62 | 16.93 | 52.98 | 0.16 |
| 8.18 | 15.32 | 51.21 | 0.2 |
| 6.26 | 10.24 | 47.49 | 0.07 |
| 8.02 | 11.1 | 47.9 | 0.07 |
| 8.35 | 17.43 | 49.02 | 0.08 |

TABLE 1-continued

| Defectivity Data | 1st PTD RF For/Rev Power | 2nd PTD ILD Dep; Gas flow A&B and Chamber Pressure | 3rd PTD Litho; X&Y Rotational Misalignment |
|---|---|---|---|
| 9.54 | 17.7 | 49.81 | 0.09 |
| 5.16 | 10.01 | 48.35 | 0.12 |
| 8.4 | 13.18 | 51.53 | 0.14 |
| 4.29 | 8.77 | 48.47 | 0.08 |
| 13.63 | 26.42 | 52.77 | 0.12 |
| 9.66 | 18.73 | 49.67 | 0.19 |
| 12.27 | 23.07 | 47.3 | 0.06 |
| 10.55 | 22.67 | 49.15 | 0.08 |
| 11.3 | 20.63 | 53.37 | 0.05 |
| 9.93 | 14.4 | 47.53 | 0.17 |
| 9.14 | 13.82 | 49.68 | 0.26 |
| 13.05 | 28.33 | 46.62 | 0.18 |
| 1.93 | 1.96 | 46.48 | 0.21 |
| 7.21 | 7.96 | 48.45 | 0.15 |
| 9.57 | 21.2 | 45.84 | 0.15 |
| 8.27 | 16.68 | 53.39 | 0.08 |
| 8.69 | 13.82 | 46.65 | 0.15 |
| 13.71 | 22.11 | 46.74 | 0.23 |
| 10.71 | 16.61 | 52.58 | 0.12 |
| 14.03 | 25.3 | 49.14 | 0.19 |
| 15.06 | 25.76 | 48.85 | 0.19 |
| 8.26 | 15.63 | 50.53 | 0.21 |
| 10.85 | 20.63 | 49.33 | 0.11 |
| ... | ... | ... | ... |
| ... | ... | ... | ... |

Using the first row of table 1 as an example, processing the test wafer in the etching tool with process tool data of 25.49, in the CVD tool with process tool data of 47.71, and in the lithography tool with a process tool data of 0.17 resulted in a defectivity of 14.37. Stepwise regression analysis may be performed on the data of table 1 to determine the relationship between defectivity and process tool data. An example initial model relating the first, second, and third process tool data to defectivity in the via process module may be expressed as follows:

$$\lambda_{via} = 0.42 \text{ (via etch; } RF \text{ For/Rev Power)} + 0.038 \text{ (ILD deposition; gas flow } A\&B \text{ and chamber pressure)} + 5.12 \text{ (lithography; } X\&Y \text{ rotational misalignment)}$$

The relationship between the expected yield of the via process module and the first, second, and third process tool data may be found by substituting $\lambda_{via}$ in the yield equation, $$Y = e^{-\lambda N}$$

By tracking process tool data for each particular tool in each particular process step and collecting more samples of process tool data using product wafers, an extended model for the via process module may be similarly created.

As can be appreciated, the method 400 may be performed manually, automatically, or a combination of both without detracting from the merits of the present invention. For example, process tool data may be sent by the tools to a fab-wide data system or collected at individual tools for transmission to a local or remote process control center. Statistical analysis for building the initial and extended models may be performed using computers configured to receive process tool data and defectivity data manually or automatically. An example system for performing the method 400 is now explained with reference to FIG. 6.

Figure 6:
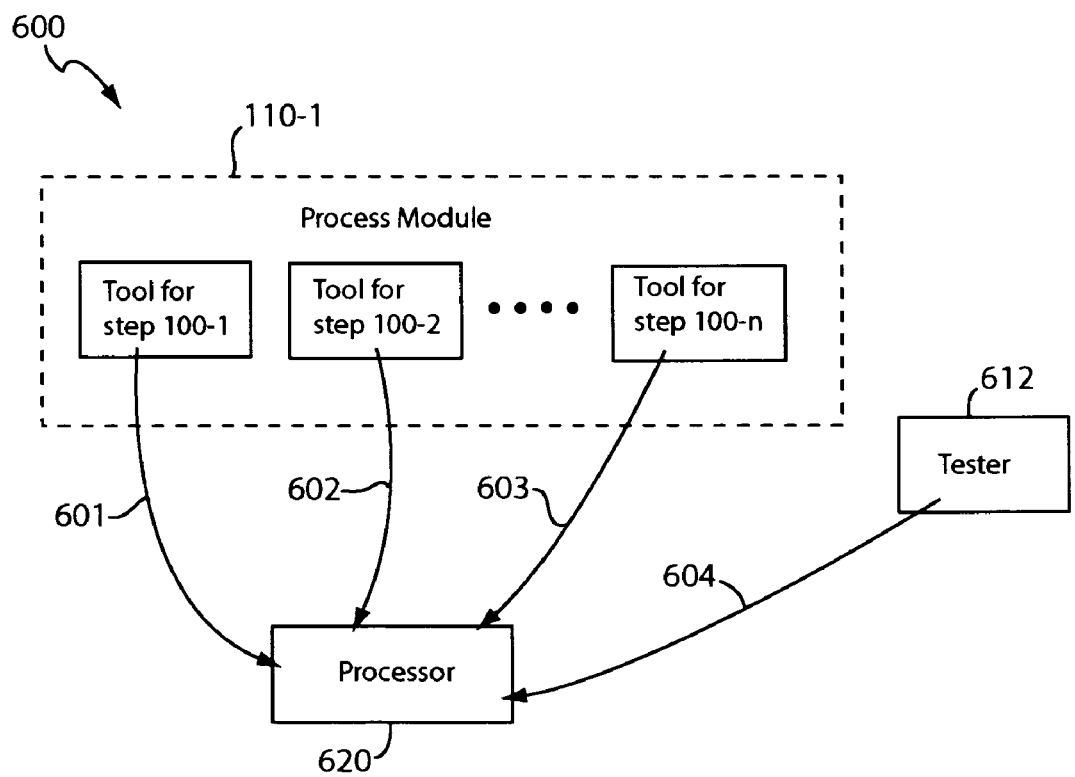
FIG. 6 schematically shows a system for identifying yield-relevant process parameters in an integrated circuit device fabrication process in accordance with an embodiment of the present invention.

FIG. 6 schematically shows a system 600 for identifying yield-relevant process parameters in an integrated circuit device fabrication process in accordance with an embodiment of the present invention. System 600 may comprise the tools of the process module being evaluated, which is the process module 110-1 in this example. As previously explained with reference to FIGS. 1 and 3, the process module 110-1 may have tools for each of process steps 100-1, 100-2, etc. Process tool data from each of the tools in the process module 110-1 may be electronically received in the processor 620 over a computer network coupling the tools, the processor 620, and a tester 612. Similarly, defectivity data may be transmitted by the tester 612 to the processor 620 over the same computer network. The tester 612 may comprise an automated test equipment for testing integrated circuit structures. The tester 612 may perform probing or non-probing (e.g., e-beam for voltage contrasts) tests on wafers processed in the tools of the process module 110-1. The processor 620 may comprise a computer configured to receive process tool data from the tools of the process module 110-1 (arrows 601-603) and defectivity data from the tester 612 (arrow 604). The processor 620 may also be configured to include software packages for performing statistical analysis and other data processing to implement the method 400.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of identifying yield-relevant process parameters in an integrated circuit device fabrication process, the method comprising:

processing a first set of wafers in one or multiple process modules of an integrated circuit (IC) device fabrication process to create a first set of test structures in the first set of wafers, the process module comprising a plurality of process steps with each process step including a tool where a wafer in the first set of wafers is processed;

obtaining a first set of process tool data from a first set of tools in the process module, the first set of process tool data comprising process parameters by which the first set of wafers is processed in the first set of tools;

testing the first set of test structures in the first set of wafers to obtain a first set of defectivity data, the first set of defectivity data comprising defects found in testing the first set of test structures; and relating the first set of process tool data to a first yield of the process module to determine an impact of one or more process parameters to the first yield by determining a relationship between the first set of process tool data and the first set of defectivity data and using the relationship between the first set of process tool data and the first set of defectivity data to represent the first yield in terms of the first set of process tool data.

2. The method of claim 1 further comprising:

creating an initial model defining the relationship between the first set of process tool data and the first set of defectivity data.

3. The method of claim 2 further comprising:

obtaining statistics of the first set of process tool data;

compressing the statistics of the first set of process tool data; and using the compressed statistics of the first set of process tool data to create the initial model.

4. The method of claim 1 further comprising:

ranking the first set of process tool data in order of their impact on the first yield of the process module.

5. The method of claim 1 wherein the first set of process tool data comprises process parameters that occur whenever a wafer is processed in a tool of a process step in the plurality of process steps.

6. The method of claim 1 further comprising:
processing a second set of wafers in the process module of the IC device fabrication process to create a second set of test structures in the second set of wafers;
obtaining a second set of process tool data from a second set of tools in the process module, the second set of process tool data comprising process parameters by which the second set of wafers is processed in the second set of tools and low frequency parameters, the low frequency parameters comprising data on events that do not occur every time a wafer is processed in the second set of tools;
testing the second set of test structures in the second set of waters to obtain a second set of defectivity data, the second set of test structures being located in areas in the second set of wafers not occupied by product integrated circuit devices, the second set of defectivity data comprising defects found in testing the second set of test structures; and
relating the second set of process tool data to a second yield of the process module.

7. The method of claim 6 further comprising creating an extended model defining a relationship between the second set of process tool data and the second set of defectivity data.

8. The method of claim 6 further comprising creating a process control specification based on a relationship of the second set of process tool data to the second yield of the process module.

9. A system for identifying yield-relevant process parameters in an integrated circuit (IC) device fabrication process, the system comprising:
a plurality of tools each configured to perform a processing step on a wafer in a plurality of wafers;
a tester configured to test the plurality of wafers processed in the plurality of tools; and
a processor configured to receive process tool data from the plurality of tools and defectivity data from the tester and to represent a yield of a process module that includes the plurality of tools in terms of the process tool data.

10. The system of claim 9 wherein the processor is configured to build a model describing a relationship between the process tool data and the defectivity data.

11. The system of claim 9 wherein the process tool data comprises process parameters by which the plurality of wafers is processed in the plurality of tools.

12. A method of identifying yield-relevant process parameters in an integrated circuit (IC) device fabrication process, the method comprising:
processing a first set of wafers to build a test structure in each of the first set of wafers;
obtaining a first set of process tool data from each tools used to build the test structure in each of the first set of wafers;
testing the test structure in each of the first set of wafers to obtain a first set of defectivity data; and
representing a first yield of the IC device fabrication process in terms of the first set of process tool data.

13. The method of claim 12 wherein at least one wafer in the first set of wafers is processed to include test structures that are not product device for commercial sale.

14. The method of claim 12 wherein the first set of process tool data includes process parameters by which a wafer in the first set of wafers is processed by a tool.

15. The method of claim 12 further comprising:
ranking the first set of process tool data in order of their impact on the yield of the IC device fabrication process.

16. The method of claim 12 wherein the first set of process tool data comprises process parameters that occur whenever a wafer is processed in a tool of a process step in the IC device fabrication process.

17. The method of claim 12 further comprising:
creating an initial model defining a relationship between the first set of process tool data and the first set of defectivity data.

18. The method of claim 17 further comprising:
obtaining statistics of the first set of process tool data;
compressing the statistics of the first set of process tool data; and
using the compressed statistics of the first set of process tool data to create the initial model.

19. The method of claim 12 further comprising:
processing a second set of wafers to build a test structure in each of the second set of wafers;
obtaining a second set of process tool data from each tool used to build the test structure in each of the second set of wafers;
testing the test structure in each of the second set of wafers to obtain a second set of defectivity data; and
relating data in the second set of process tool data to a second yield of the IC device fabrication process.

20. The method of claim 19 wherein the second set of process tool data includes data selected from the first set of process tool data.

* * * * *